Patented Nov. 7, 1933

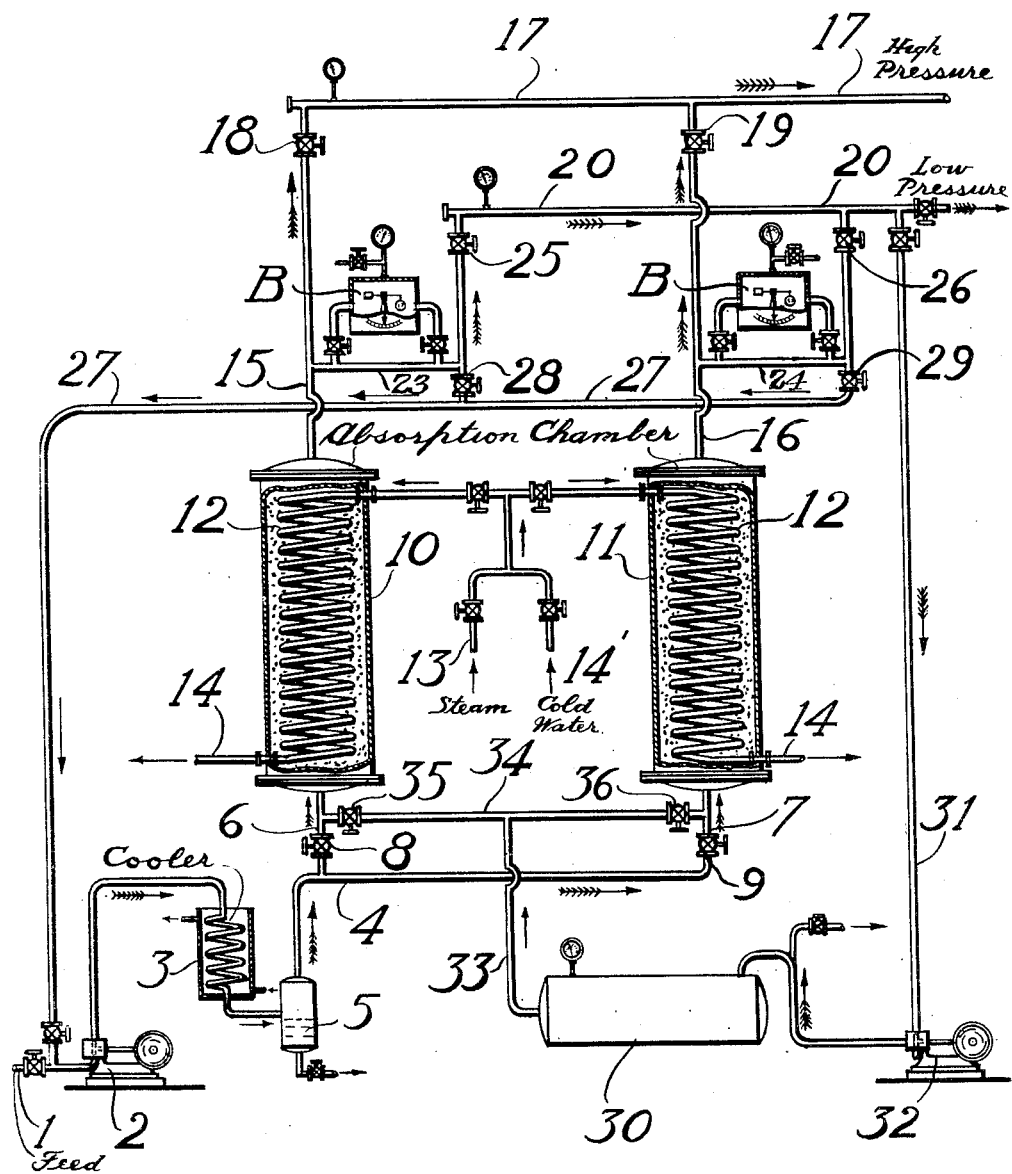

1,934,075

UNITED STATES PATENT OFFICE 1,934,075

PROCESS FOR THE TREATMENT OF GASES

Warren K. Lewis, Newton, Mass., assignor to Standard Oil Development Company, a corporation of Delaware Application November 12, 1928
Serial No. 318,680

6 Claims. (Cl. 23—210)

The present invention relates to the art of concentrating gas mixtures and more specifically comprises an improved method for obtaining a gas rich in hydrogen from a less concentrated mixture composed of hydrogen and hydrocarbon gas. My process will be fully understood from the following description and the drawing which illustrates one form of apparatus for use in my invention.

The drawing is a semi-diagrammatic view in sectional elevation of an apparatus constructed according to my invention.

Referring to the drawing, reference character 1 denotes a feed pipe for the gas mixture to be treated, and while my process may be adapted to any gas mixture, one component of which is more strongly adsorbed by activated charcoal or similar substances than another, the following description will be specifically directed to the process of treating mixtures of hydrogen and hydrocarbon gas with or without other gases such as nitrogen, carbon dioxide and the like.

The gas entering by pipe 1 is highly compressed by a compressor 2 which may be of one or more stages, and the high pressure mixture is cooled by cooler 3 before entering a manifold 4. Condensate may be removed by drip tank 5 in the usual manner. Branch pipes 6 and 7 which are fitted with block valves 8 and 9 are provided to conduct the gas into either one or the other of the adsorption chambers 10 and 11 respectively.

The adsorption chambers are adapted to withstand pressures of 100 to 200 atmospheres or more and may be of any particular design affording substantially uniform distribution of gas to the adsorption material with which the chambers are filled. Heating or cooling coils 12 may be arranged through the body of the adsorption material and are fitted with inlet pipes 13 and 14' for heating and cooling media respectively, such as steam and cold water. Coils 12 discharge through outlet pipes 14.

Chambers 10 and 11 are fitted with outlet pipes 15 and 16 respectively which are connected to a high pressure manifold 17. The flow of gas from pipes 15 and 16 to manifold 17 is controlled by block valves 18 and 19, and the manifold conducts the unadsorbed gas to storage (not shown) or to the point at which it is to be used. Lines 15 and 16 are also connected with a low pressure manifold 20 by pipes 23 and 24 in which gas balances B or other suitable devices for measuring density of gases are fitted. These devices B are not shown in detail since they are well known in the art, but they should be adapted to operate at considerable pressure. Manifold 20 conducts the adsorbed gas, after release, as will be described, to storage (not shown) or to the place where it is to be used. Block valves 25 and 26 control communication between lines 15 and 16 and low pressure manifold 20, as will be understood. Pipes 23 and 24 are also connected to a pipe 27, through block valves 28 and 29, which conducts gas back to the inlet of compressor 2 or to an intermediate stage of the compressor.

A high pressure cylinder 30 for methane storage is connected into the system by pipe 31 which conducts gas from manifold 20 and in which a compressor 32 is connected. Storage cylinder 30 is also connected by an outlet pipe 33 to a manifold 34 which communicates with lines 6 and 7 through block valves 35 and 36.

In the operation of my process I have discovered that the use of high pressure not only increases the total volume of gas adsorbed per unit weight of adsorbent, but also increases the preferential adsorption of certain gases from their mixtures with other gases. For example, the ratio of the volume of methane adsorbed to that of hydrogen from a mixture of these gases is greatly increased by the use of high pressure. In my process I pass a highly compressed mixture of gases alternatively through the chambers 10 and 11. While the gas is passing through chamber 10, valves 8 and 18 are open, and valves 9, 19, 25, 28 and 35 are closed. When the adsorbent material in chamber 10 is saturated, valves 8, 18, 26, 29 and 36 are closed, and valves 9 and 19 are opened, thus diverting the high pressure gas through chamber 11 and out through line 16 and manifold 17. This gas is found to be considerably richer in hydrogen than the inlet gas, as will be understood.

The next stage of the process is to expel the adsorbed gas from the charcoal. This may be done by reduction of pressure by opening valve 25 and allowing the adsorbed gas as well as the gas which fills the voids between the charcoal grains to escape thru manifold 20. Steam may also be introduced into coil 12 to heat the charcoal to about 300 or 400° C. The preferred method of removing the gas from the charcoal is, however, as follows: Valves 35 and 28 are gradually opened and gas from cylinder 30 is admitted to chamber 11 so that the pressure therein remains substantially constant. The gas flowing from chamber 10 passes thru the gravity measuring device B, which is preferably a simple gas balance, until the gravity indicates that practically no hydrogen is in the mixture. This is a simple matter since the difference between the gravity of hydrogen and methane, the lightest of the hydrocarbons, is very great. When, therefore, substantially no hydrogen remains in the outflowing gas, valves 28 and 35 are closed and valve 25 is opened slowly so that the fall in pressure is slow. A part of this outflowing gas, substantially free of hydrogen is recompressed to recharge cylinder 30 and when this is accomplished the remaining gas is conducted from the system by line 20. The charcoal in chamber 10 may be heated, as described before, and when substantially all methane is removed cold water is passed thru coil 12 to cool the charcoal for another cycle. By this means it will be seen that only substantially hydrogen-free gas passes into manifold 20 and the gas held between the grains of charcoal will be displaced and returned for retreatment. Hydrogen of high purity may be obtained by this method.

It will be readily understood that more than two adsorption chambers may be used and they may be arranged so that the gas passes in series through two or more chambers while a third chamber is being freed of its adsorbed charge. When the first chamber of the series is saturated, it may be cut out of the system, the fresh gas diverted into the second chamber of the series, and the third chamber connected to the end of the series. In this manner one chamber may always be in the process of giving up adsorbed gas, while the gas to be treated flows through the remaining chambers. Countercurrent contact of gas with charcoal will be accomplished in this way as will be understood.

As an example of the operation of my process, mixtures of methane and hydrogen are passed into and through chambers containing activated charcoal until saturation is reached. Activated charcoal is saturated at atmospheric pressure and 25° C. with a gas 23.1% $CH_4$ and 74.6% $H_2$. The adsorbed gas is removed by heating to 400° C. and after correction for the gas in the free space the adsorbed gas has a ratio of methane to hydrogen of 4.88. A gas containing 22.5% methane and 77.5% hydrogen is then passed through fresh charcoal until saturated at a pressure of 1500 pounds per square inch and at 25° C. After again correcting for the gas in the free space around the charcoal it is found that the ratio of methane to hydrogen adsorbed is infinite. In other words, substantially no hydrogen is adsorbed under these conditions.

While I have described my process particularly in reference to treating mixtures of hydrogen and hydrocarbons, it will be understood that it is applicable to other gas mixtures. It is possible to separate a mixture of gases substantially completely by repeated applications of my method, but it is particularly advantageous in separating a mixture into two fractions, one rich in one component and the other in another, without making a complete separation. Likewise adsorbents, other than activated carbon or charcoal, may be used, such as bone char or other well known adsorbents.

In the following claims the expression "pressure substantially greater than that of the atmosphere" is meant to designate a pressure in excess of approximately 20 atmospheres.

My invention is not to be limited by any theory of the mechanism of the process, nor by any example given merely by way of illustration, but only by the following claims in which I wish to claim all novelty inherent in the invention.

I claim:

1. The improved process for substantially increasing the selective absorbent capacity of activated carbon used in obtaining a gas rich in hydrogen from a mixture of gases comprising hydrogen and hydrocarbon gas, which comprises bringing the mixture in contact with activated carbon under pressure substantially greater than that of the atmosphere, and withdrawing a gas rich in hydrogen.

2. The improved process for substantially increasing the selective adsorbent capacity of activated carbon used in separating mixtures of hydrogen and hydrocarbon gas into mixtures rich in hydrogen and hydrocarbons respectively, which comprises bringing the mixture in contact with activated carbon under a pressure in excess of 20 atmospheres while maintaining temperature below 100° F., withdrawing the unadsorbed gas, removing and separately collecting the adsorbed gas by reducing the pressure.

3. The improved process for obtaining gases rich in hydrogen and hydrocarbons respectively from mixtures of such gases comprising the following cycle of operations, passing the mixture under a pressure substantially greater than that of the atmosphere through a body of activated charcoal until substantial saturation and withdrawing a gas rich in hydrogen therefrom, passing a gas richer in hydrocarbon than said mixtures into the saturated charcoal, whereby unadsorbed gas held between grains of charcoal is displaced, then reducing pressure on the saturated body of charcoal and withdrawing a gas rich in hydrocarbon.

4. Process according to claim 3, in which the displaced gas is returned for retreatment in admixture with the original mixture.

5. Process according to claim 3, in which pressure on the saturated charcoal is reduced slowly and a part of the gas evolved is recompressed and used to displace unadsorbed gas from saturated charcoal in a following cycle.

6. Process according to claim 3, in which a plurality of bodies of charcoal are used alternately in the series of steps.

WARREN K. LEWIS.